Patented June 8, 1943

2,321,069

UNITED STATES PATENT OFFICE 2,321,069

PRODUCTION OF CELLULOSE DERIVATIVES

Henry Dreyfus, London, England, assignor to Celanese Corporation of America, a corporation of Delaware No Drawing. Application July 17, 1941, Serial No. 402,851. In Great Britain April 19, 1940

5 Claims. (Cl. 260—224)

This invention is concerned with improvements in or relating to the production of cellulose derivatives and in particular to a process for the treatment of cellulose derivatives containing unsaturated radicles.

A considerable number of cellulose derivatives containing unsaturated radicles are known. Examples of such cellulose esters are cellulose crotonate, maleate, linolenate, oleate, ricinoleate, undecylenate and cinnamate while allyl and crotyl celluloses are examples of cellulose ethers. It has now been discovered that by treating a cellulose derivative containing an unsaturated radicle with potassium bisulphite or other bisulphite it may be converted into a derivative containing a sulphonic acid radicle or a salt thereof, both of which have properties quite different from those of the unsaturated cellulose derivative. For instance, products may be obtained which can be dispersed or even dissolved in water or liquids containing a high proportion of water whereas the cellulose derivatives are quite insoluble in such liquids.

Instead of using a bisulphite a sulphite may be employed when the reaction conditions are such as to convert it into a bisulphite. For example, a reaction mixture containing a sulphite may be used and sulphur dioxide passed through. Again, a sulphite may be employed with an unsaturated cellulose derivative containing a free acidic group, e. g. cellulose maleate, in which case intermediate formation of bisulphite probably occurs.

The production of the sulphonic acid derivative may be effected by heating an unsaturated cellulose derivative with a bisulphite, for example potassium or sodium bisulphite, in a liquid which is a solvent for the bisulphite. Water alone may be employed or an aqueous solution of an organic liquid, for example dioxane, which has a solvent or swelling action on the cellulose derivative. The reaction may be effected, for example, by refluxing an unsaturated cellulose derivative with 10 or 12 times its weight of an aqueous solution of a bisulphite for about 10 to 20 hours. The amount of bisulphite present in the solution depends to some extent on the proportion of unsaturated groups present in the cellulose derivative. In general an amount of a bisulphite molecularly equivalent to two or three times that theoretically required to react with all the unsaturated groups present is sufficient.

The process is applicable to simple cellulose derivatives which contain only one type of substituent radicle, and that an unsaturated radicle and also to cellulose derivatives containing two or more types of substituent radicles, one or more of which may be unsaturated radicles. For example, mixed cellulose derivatives which may be treated are cellulose acetate oleate, and a cellulose acetate containing crotyl radicles.

The following is an example of the process:

1 part by weight of finely divided cellulose crotonate containing 2–2½ crotonyl radicles per $C_6H_{10}O_5$ unit is refluxed for 10–15 hours in 20–30 times its weight of an aqueous medium containing about 10% dioxane and 15–20% of sodium bisulphite. The mixture should be well stirred during the treatment. The cellulose ester is then separated, well washed and dried.

Having described my invention, what I desire to secure by Letters Patent is:

1. Process for the production of sulphur-containing cellulose derivatives, which comprises reacting with a bisulphite an organic derivative of cellulose selected from the group consisting of organic acid esters and ethers of cellulose in which a substituent radicle contains an ethylene linkage by heating the reactants.

2. Process for the production of sulphur-containing cellulose derivatives, which comprises reacting an organic derivative of cellulose selected from the group consisting of organic acid esters and ethers of cellulose in which a substituent radicle contains an ethylene linkage with a bisulphite by heating the cellulose derivative in an aqueous solution of the bisulphite at the boiling point of the solution.

3. Process for the production of sulphur-containing cellulose derivatives, which comprises reacting an organic derivative of cellulose selected from the group consisting of organic acid esters and ethers of cellulose in which a substituent radicle contains an ethylene linkage with a bisulphite selected grom the group consisting of sodium and potassium bisulphites by heating the cellulose derivative in an aqueous solution of the bisulphite.

4. Process for the production of sulphur-containing cellulose derivatives, which comprises reacting an organic derivative of cellulose selected from the group consisting of organic acid esters and ethers of cellulose in which a substituent radicle contains an ethylene linkage with a bisulphite by heating the cellulose derivative in a solution of the bisulphite in a liquid medium which has a swelling action on the cellulose derivative.

5. Process for the production of sulphur-containing cellulose derivatives, which comprises reacting an organic derivative of cellulose selected from the group consisting of organic acid esters and ethers of cellulose in which a substituent radicle contains an ethylene linkage with a bisulphite by heating the cellulose derivative at the boiling point with an aqueous solution of a bisulphite selected from the group consisting of sodium and potassium bisulphites in a liquid medium which has a swelling action on the cellulose derivative.

HENRY DREYFUS.